United States Patent
Lee et al.

(10) Patent No.: US 9,464,881 B2
(45) Date of Patent: Oct. 11, 2016

(54) DISPLACEMENT SENSOR, APPARATUS FOR DETECTING DISPLACEMENT, AND METHOD THEREOF

(71) Applicant: Silicon Works Co., Ltd., Daejeon (KR)

(72) Inventors: Jong Kyoung Lee, Daegu (KR); Jin Yong Jeon, Daejeon (KR); Yoo Sung Kim, Seoul (KR); Jang Hyun Yoon, Seoul (KR)

(73) Assignee: Silicon Works Co., Ltd., Daejeon (KR)

( * ) Notice: Subject to any disclaimer, the term of this patent is extended or adjusted under 35 U.S.C. 154(b) by 0 days.

(21) Appl. No.: 13/953,189

(22) Filed: Jul. 29, 2013

(65) Prior Publication Data
US 2014/0035564 A1   Feb. 6, 2014

(30) Foreign Application Priority Data

Aug. 1, 2012 (KR) .................. 10-2012-0084415
Aug. 1, 2012 (KR) .................. 10-2012-0084417

(51) Int. Cl.
*G01B 7/14* (2006.01)
*G01D 5/20* (2006.01)

(52) U.S. Cl.
CPC .................. *G01B 7/14* (2013.01); *G01D 5/204* (2013.01)

(58) Field of Classification Search
CPC .. G01R 33/04; G01R 35/005; G01D 5/2053; G01D 5/2046; G01D 5/202; F02D 11/106; G01B 7/003; G01L 3/105
USPC ....................... 324/207.17, 207.25
See application file for complete search history.

(56) References Cited

U.S. PATENT DOCUMENTS

| | | |
|---|---|---|
| 4,904,921 A | 2/1990 | DeVito et al. |
| 6,166,535 A | 12/2000 | Irle et al. |
| 6,255,810 B1 | 7/2001 | Irle et al. |
| 6,366,078 B1 | 4/2002 | Irle et al. |
| 6,384,598 B1 | 5/2002 | Hobein et al. |
| 6,448,759 B2 | 9/2002 | Madni et al. |

(Continued)

FOREIGN PATENT DOCUMENTS

| | | |
|---|---|---|
| KR | 10-2010-0003172 A | 1/2010 |
| WO | 2005/098370 | 10/2005 |

(Continued)

*Primary Examiner* — Arleen M Vazquez
*Assistant Examiner* — Alesa Allgood
(74) *Attorney, Agent, or Firm* — Mintz Levin Cohn Ferris Glovsky and Popeo, P.C.; Kongsuk Kim; Jonathon Western (57) ABSTRACT

Disclosed herein are a displacement sensor and a displacement detection apparatus and method. The displacement detection apparatus according to an embodiment of the present invention includes a receiving unit for receiving a plurality of receiver signals dependent on displacement of a coupler element, an acquisition unit for acquiring information about the displacement of the coupler element and information about a gap between the coupler element and a transmitting coil or the plurality of receiver coils by using the plurality of receiver signals, and a compensation unit for compensating for the acquired displacement information using the acquired gap information. The acquisition unit acquires the displacement information of the coupler element using one of the plurality of receiver signals, and acquires a compensation signal, independent of the displacement of the coupler element including the gap information, using remaining receiver signals.

8 Claims, 11 Drawing Sheets

(56) References Cited

U.S. PATENT DOCUMENTS

| | | | |
|---|---|---|---|
| 6,483,295 B2 | 11/2002 | Irle et al. | |
| 7,191,759 B2* | 3/2007 | Lee | G01D 5/2053 123/399 |
| 7,221,154 B2 | 5/2007 | Lee | |
| 7,276,897 B2* | 10/2007 | Lee | 324/207.17 |
| 7,345,473 B2* | 3/2008 | Lee | G01D 5/202 324/207.11 |
| 7,449,878 B2 | 11/2008 | Lee | |
| 7,482,803 B2 | 1/2009 | Lee et al. | |
| 7,538,544 B2 | 5/2009 | Lee | |
| 7,821,256 B2 | 10/2010 | Lee | |
| 7,906,960 B2 | 3/2011 | Lee | |
| 7,911,354 B2 | 3/2011 | Kim | |
| 2001/0005133 A1* | 6/2001 | Madni | G01D 5/2053 324/207.17 |
| 2003/0102862 A1* | 6/2003 | Goto | G01D 3/0365 324/207.16 |
| 2008/0007251 A1* | 1/2008 | Lee | B62D 6/10 324/207.17 |
| 2011/0181302 A1 | 7/2011 | Shao et al. | |

FOREIGN PATENT DOCUMENTS

| | | |
|---|---|---|
| WO | 2007/000653 | 1/2007 |
| WO | 2008/087545 | 7/2008 |
| WO | 2009/037561 | 3/2009 |
| WO | 2009/074864 | 6/2009 |

* cited by examiner

DISPLACEMENT SENSOR, APPARATUS FOR DETECTING DISPLACEMENT, AND METHOD THEREOF

CROSS-REFERENCE TO RELATED APPLICATION

This application claims under 35 U.S.C. §119(a) the benefit of Korean Applications No. 10-2012-0084415 filed on Aug. 1, 2012, and No. 10-2012-0084417 filed on Aug. 1, 2012, which applications are incorporated herein by reference.

TECHNICAL FIELD

The present invention relates, in general, to the detection of displacement and, more particularly, to a displacement sensor and a displacement detection apparatus and method, which use the structure of a plurality of receiver coils (or receiving coils), each including two loops having different winding directions, to perform signal processing, and a coupler element corresponding to the receiver coils, and which allow a processor or a module to be capable of compensating for the displacement information of the coupler element depending on a gap using a plurality of receiver signals received from a displacement sensor.

BACKGROUND ART

Typically, a part such as a throttle pedal in vehicles is mechanically connected to an engine throttle via a cable. However, in the latest vehicles, a throttle position sensor is mechanically connected to a throttle pedal and then generates an electrical output signal indicating the degree of pressing of the throttle pedal. This system is typically referred to as a "fly-by-wire" system.

In one type of throttle position sensor, a transmitting coil or an exciter coil is excited by a high-frequency source, and then the transmitting coil generates electromagnetic radiation. This transmitting coil is arranged in the shape of a circular pattern, but another pattern structure may be used instead of the circular pattern.

A receiver coil is arranged on a position sensor located near the transmitting coil. Therefore, when the transmitting coil is excited, the receiver coil generates an output signal due to inductive coupling to the transmitting coil.

In order to generate an output signal indicating the position of a throttle, a coupler element is rotatably mounted on a position sensor and is then rotated in synchronization with the pressing and release of the throttle pedal. The coupler element overlaps the positions of both the transmitting coil and the receiver coil. Consequently, inductive coupling between the transmitting coil and the receiver coil is varied when the coupler element is moved or rotated.

The output signal of the receiver coil generated due to such variation in inductive coupling is varied as a function of the angular position or linear position of the coupler element and the position of a part mechanically coupled to the coupler element.

However, the output signal of the receiver coil is apt to change due to a gap between the coupler element and the transmitting (or receiving) coil, which may occur due to a production deviation or the like.

The output signal of the receiver coil may be changed due to an error in the gap, and it is very important to correct such changes to detect accurate displacement.

Therefore, the requirement of a displacement sensor capable of correcting a gap error and then detecting displacement has been emphasized.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, the present invention has been made keeping in mind the above problems occurring in the prior art, and an object of the present invention is to provide a displacement sensor, which can acquire displacement information in which a gap is taken into consideration by using a plurality of receiver signals generated by the structure of a plurality of receiver coils and a coupler element corresponding thereto.

Another object of the present invention is to provide a displacement detection apparatus and method, which can acquire displacement information in which a gap is taken into consideration by using a plurality of receiver signals received from a plurality of receiver coils, each including two loops having different winding directions, depending on relations with the coupler element.

A further object of the present invention is to provide a displacement detection apparatus and method, which can improve the accuracy of displacement detection by compensating for an error in a gap with a coupler element.

In order to accomplish the above objects, a displacement detection apparatus according to an embodiment of the present invention comprising a processor which includes a receiving unit for receiving a plurality of receiver signals dependent on displacement of a coupler element; an acquisition unit for acquiring information about the displacement of the coupler element and information about a gap between the coupler element and one of: a transmitting coil and a plurality of receiver coils by using the plurality of receiver signals; and a compensation unit for compensating for the acquired displacement information using the acquired gap information.

The acquisition unit may acquire the displacement using one of the plurality of receiver signals, and acquire a compensation signal, independent of the displacement of the coupler element and including the gap information, using other of the plurality of receiver signals.

The processor included in the displacement detection apparatus may further include a selection unit for selecting one receiver signal having a signal variation differing from that of other receiver signals, from among the plurality of receiver signals, depending on the displacement of the coupler element, wherein the acquisition unit acquires the displacement information using the one receiver signal selected by the selection unit.

The receiving unit may receive the plurality of receiver signals, one of which has a signal variation differing from that of other of the plurality of receiver signals, depending on the displacement of the coupler element.

Further, a displacement detection method according to an embodiment of the present invention includes receiving, by a processor, a plurality of receiver signals dependent on displacement of a coupler element; acquiring, by the processor, information about the displacement of the coupler element and information about a gap between the coupler element and one of: a transmitting coil and a plurality of receiver coils by using the plurality of receiver signals; and compensating for, by the processor, the acquired displacement information using the acquired gap information.

The acquiring may be further configured to acquire the displacement information using one of the plurality of receiver signals, and acquire a compensation signal, independent of the displacement of the coupler element and including the gap information, using other of the plurality of receiver signals.

Furthermore, a displacement sensor according to an embodiment of the present invention includes a movable coupler element mutually associated with a position of a part; a transmitting coil excited by an excitation signal and configured to generate electromagnetic radiation; a plurality of receiver coils, each including two loops having different winding directions and generating respective receiver signals due to inductive coupling to the transmitting coil, wherein the inductive coupling is sensitive to shielding (or disturbance or interference) of the electromagnetic radiation by the coupler element; and a signal processing unit for acquiring information about displacement of the coupler element and information about a gap between the coupler element and one of: the transmitting coil and the plurality of receiver coils by using the plurality of receiver signals generated by the plurality of receiver coils, and compensating for the acquired displacement information using the acquired gap information.

The signal processing unit may acquire the displacement information using one of the plurality of receiver signals, generate a compensation signal including the gap information using other of the plurality of receiver signals, and compensate for the acquired displacement information using the generated compensation signal.

The plurality of receiver coils may generate the plurality of receiver signals, one of which has a signal variation differing from that of other receiver signals, depending on the displacement of the coupler element.

The signal processing unit may select one of the plurality of receiver signals depending on a range of the displacement of the coupler element.

Preferably, each of the plurality of receiver coils may be configured such that two different loops are formed adjacent to each other, the two loops may have an identical area, and the coupler element may include at least one pole having a different area from a loop area of one of the two loops.

Preferably, a number of the plurality of receiver coils may be different from a number of poles of the coupler element.

Preferably, a number of the plurality of receiver coils may be at least three.

DETAILED DESCRIPTION OF THE DISCLOSURE

The above and other objects and features of the present invention will be more clearly understood from the following detailed description taken with reference to the accompanying drawings.

The terms used herein are used merely to describe specific embodiments, but are not intended to limit the present invention. The singular expressions include plural expressions unless explicitly stated otherwise in the context thereof. It should be appreciated that in this application, the terms "include(s)," "comprise(s)", "including" and "comprising" are intended to denote the presence of the characteristics, numbers, steps, operations, elements, or components described herein, or combinations thereof, but do not exclude the probability of presence or addition of one or more other characteristics, numbers, steps, operations, elements, components, or combinations thereof.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Preferred embodiments of the present invention will be described in detail with reference to the accompanying drawings. In the following description of the present invention, if it is determined that detailed descriptions of related well-known configurations or functions may make the gist of the present invention obvious, the detailed descriptions will be omitted.

However, the present invention is not restricted or limited to the embodiments. The same reference symbols represented throughout the drawings designate the same elements.

Hereinafter, a displacement sensor and a displacement detection apparatus and method according to embodiments of the present invention will be described in detail with reference to FIGS. 1 to 9.

Figure 1:
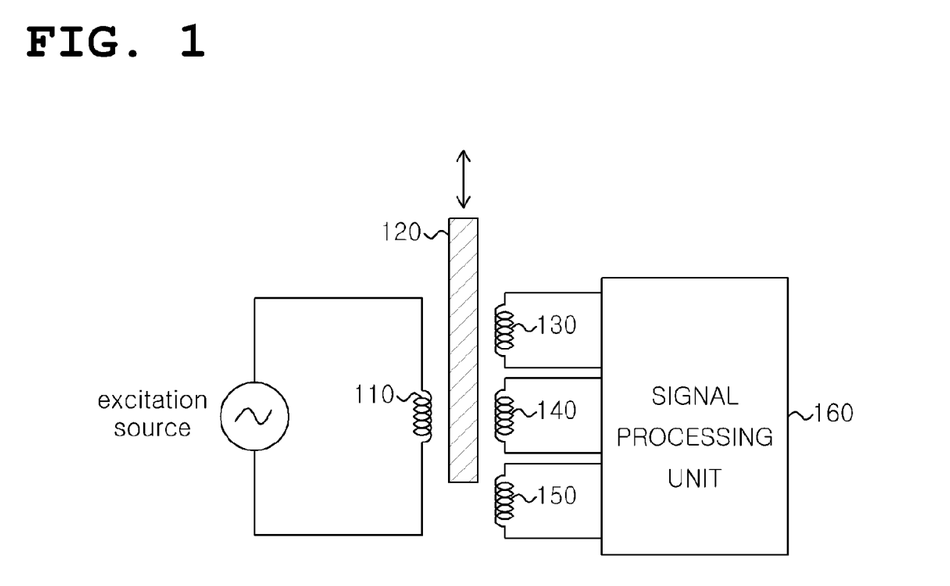
FIG. 1 is a diagram showing the configuration of a displacement sensor according to an embodiment of the present invention.
Figure 2:
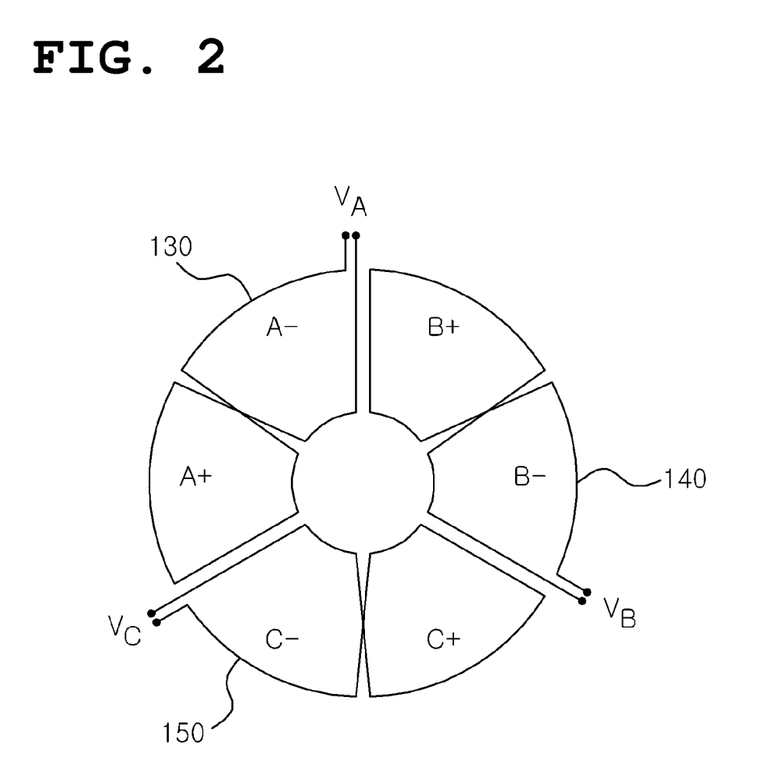
FIG. 2 is a diagram showing an example of the shape of receiver coils according to the present invention.
Figure 3:
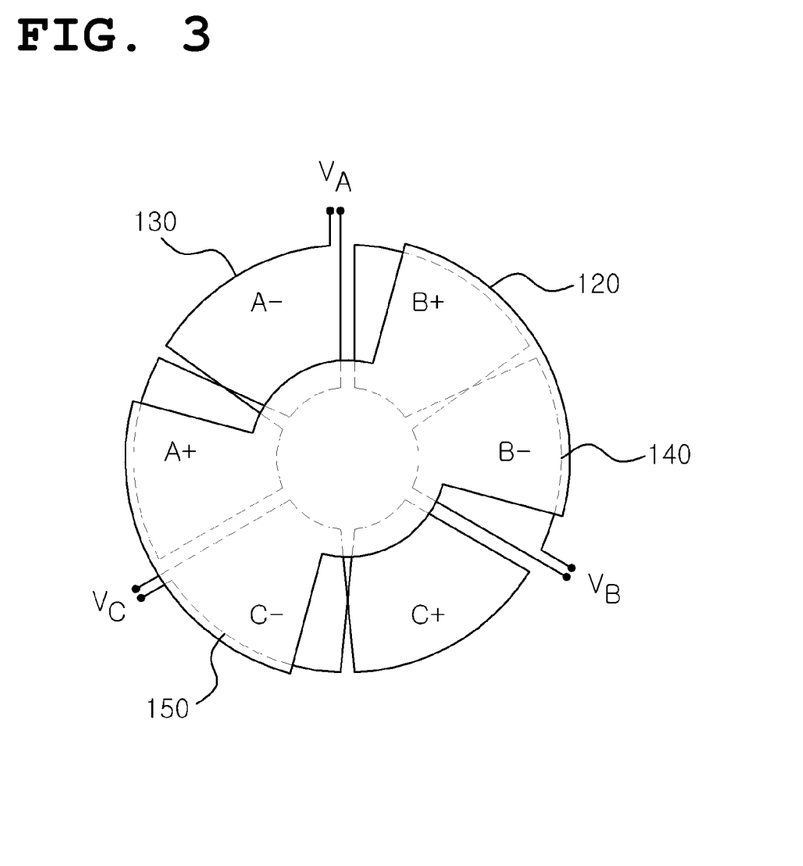
FIG. 3 is a diagram showing an example of the shape of receiver coils shown in FIG. 2 and a coupler element.

FIG. 1 is a diagram showing the configuration of a displacement sensor according to an embodiment of the present invention, FIG. 2 is a diagram showing an example of the shape of receiver coils according to the present invention, and FIG. 3 is a diagram showing an example of the shape of receiver coils shown in FIG. 2 and a coupler element.

Referring to FIGS. 1 to 3, the displacement sensor includes a transmitting coil 110, three receiver coils 130, 140, and 150, and a signal processing unit 160.

The transmitting coil 110 is excited by an excitation source and then generates a transmission signal, that is, electromagnetic radiation.

In this case, the transmitting coil 110 may be formed in a circular shape and may be formed in a specific area so that signals can be generated by the respective receiver coils 130, 140, and 150 due to inductive coupling to the receiver coils 130, 140, and 150.

The coupler element 120 is composed of two poles formed such that partial areas of the receiver coils 130, 140, and 150 are hidden by the poles. For example, each of the poles of the coupler element 120 is formed to hide 90° areas in the areas of the receiver coils 130, 140, and 150.

In this case, the areas and the number of poles may differ depending on the circumstances. It is preferable to set the number of receiver coils and the number of poles as different numbers and prevent the ratio of the numbers (the number of receiver coils to the number of poles) from being a multiple number.

Further, it is preferable to form the area of one of loops constituting each receiver coil and the area of each pole so that the areas are different from each other.

Each of the receiver coils 130, 140, and 150 includes two loops having different winding directions, and generates a receiver signal due to inductive coupling to the transmitting coil 110.

Here, such inductive coupling is varied by the movement or rotation of the coupler element 120 which overlaps the positions of the transmitting coil 110 and all the receiver coils 130, 140, and 150, and the two loops of each of the receiver coils 130, 140, and 150 may have the same area. The coupler element 120 affects the respective inductive coupling by a degree of overlap over each of the receiver coils 130, 140, and 150.

In this case, symbols (+) and (−) in loops shown in FIGS. 2 and 3 respectively mean a loop wound in a first direction and a loop wound in a second direction differing from the first direction.

Each of the receiver coils 130, 140, and 150 is configured such that two loops thereof are formed in adjacent areas and one of a plurality of generated receiver signals and the remaining receiver signals have different signal variations depending on the displacement of the coupler element 120.

That is, the receiver signals generated by the receiver coils 130, 140, and 150 may have signal variations that differ from each other depending on the displacement of the coupler element 120 in such a way that receiver signals, signal variations of which are different from each other depending on the displacement of the coupler element, for example, at intervals of an angle of 30°, are respectively present.

The present invention acquires the displacement information of the coupler element using one receiver signal having a signal variation differing from that of other receiver signals, and generates a compensation signal including information about a gap using the remaining receiver signals, thus compensating for the acquired displacement information using the compensation signal.

Here, the compensation signal is a signal that is independent of the displacement of the coupler element 120 and that is dependent on a gap irrelevant to the displacement of the coupler element 120, and the value of the compensation signal is changed not by the displacement of the coupler element 120, but only by the gap. The intensity of the receiver signal can be changed due to an area covered by the coupler element 120. That is, the signal variation (signal intensity variation) is changed in such a way that the area of the first loop wound in the first direction and the area of the second loop wound in the second direction are covered by the coupler element, so a signal generated by the first loop and a signal generated by the second loop are changed, and thus the receiver signal variation is changed.

The signal processing unit 160 is a component corresponding to a displacement detection apparatus according to the present invention, and is configured to receive three receiver signals generated by a plurality of, for example, three receiver coils 130, 140, and 150, acquire the displacement information of the coupler element 120 using one of the three received receiver signals, and acquire a compensation signal including information about a gap using the remaining receiver signals.

If the displacement information and the compensation signal have been acquired, the signal processing unit 160 compensates for the displacement information using the acquired compensation signal. That is, the signal processing unit 160 compensates for an error in the gap between the coupler element 120 and the transmitting coil 110 or the receiver coils 130, 140, and 150 using the compensation signal, thus acquiring the displacement information of the coupler element 120 in which the gap is taken into consideration.

In this case, the signal processing unit 160 may select one receiver signal required to acquire the displacement information depending on the displacement of the coupler element 120, and may generate the compensation signal using the remaining receiver signals that are not selected. The selected receiver signal may be one receiver signal having a different signal variation among the plurality of receiver signals.

Figure 4A:
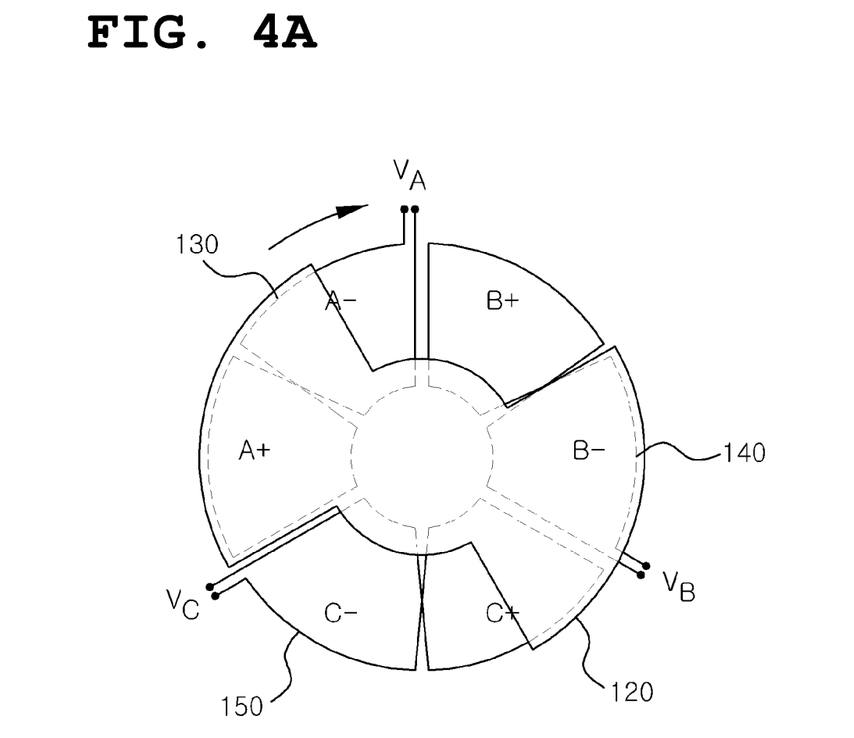
FIGS. 4A and 4B are diagrams showing an example in which the coupler element is rotated at an angle of 0 to 30°.
Figure 4B:
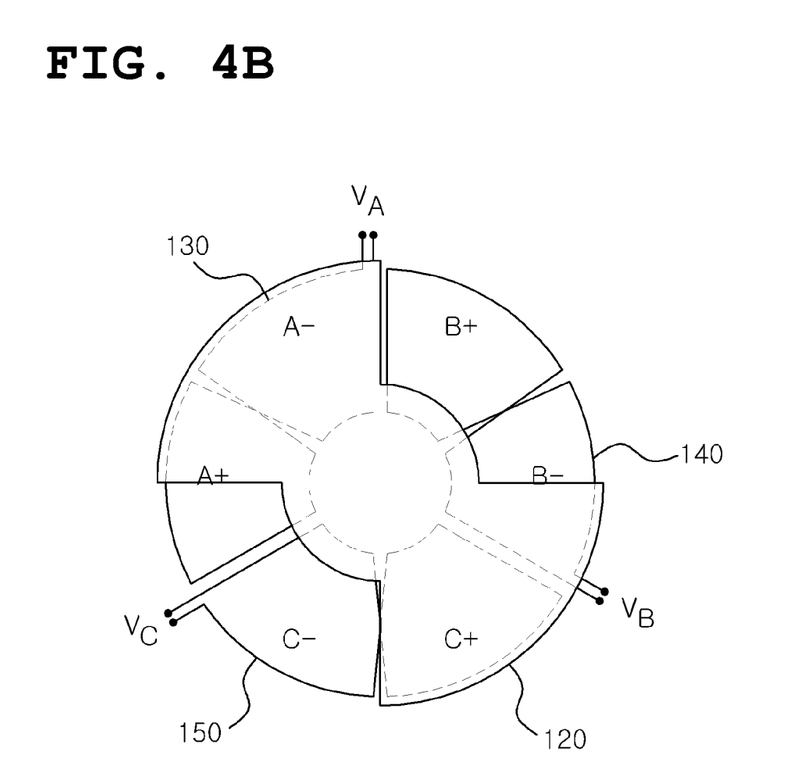

For example, as shown in FIGS. 4A and 4B, when the displacement of the coupler element changes from 0° (FIG. 4A) to 30° (FIG. 4B), the signal variation of the first receiver coil 130 is twice that of the remaining two receiver coils 140 and 150. Thus, displacement information is acquired using the receiver signal $V_A$ of the first receiver coil 130 having the different signal variation. A compensation signal, which is independent of the displacement of the coupler element and includes information about the gap, is acquired using the receiver signals $V_B$ and $V_C$ of the remaining two receiver coils 140 and 150.

Figure 5A:
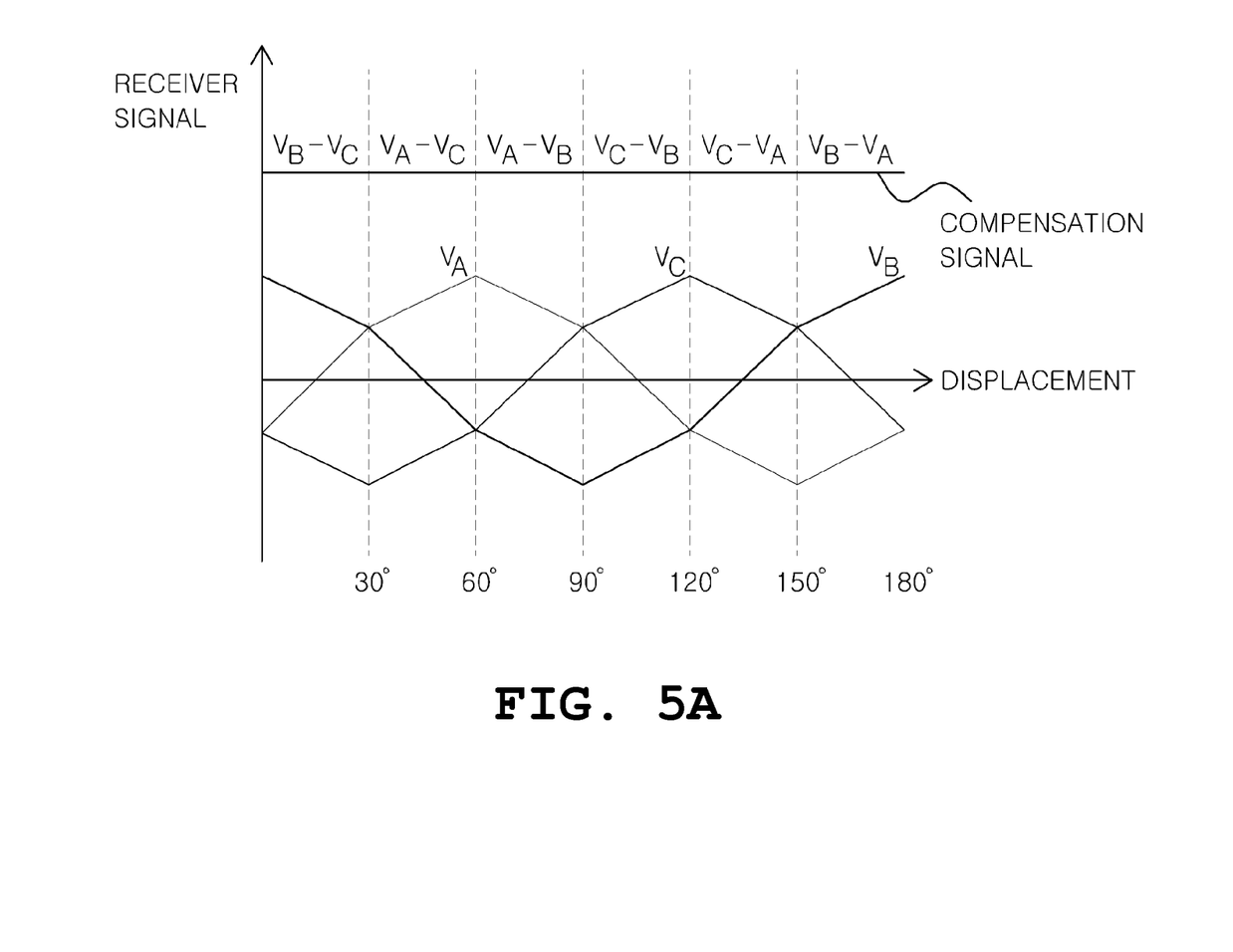
FIGS. 5A and 5B are diagrams showing an example of the waveform of receiver signals depending on the displacement of the coupler element.

A detailed description of the present invention will be given with reference to FIG. 5A. As shown in FIG. 5A, when the displacement of the coupler element changes from 0° to 30°, the signal variation of the first receiver coil 130 is twice that of the remaining two receiver coils 140 and 150. Accordingly, displacement information is acquired using the receiver signal $V_A$ of the first receiver coil having a different signal variation, and a compensation signal, independent of the displacement of the coupler element and including information about the gap, is acquired using a difference $V_B-V_C$ between the remaining two receiver signals $V_B$ and $V_C$. Meanwhile, when the displacement of the coupler element changes from 30° to 60°, the signal variation of the second receiver coil 140 is twice that of the remaining two receiver coils 130 and 150. Accordingly, displacement information is acquired using the receiver signal $V_B$ of the second receiver coil 140, and a compensation signal is acquired using a difference $V_A-V_C$ between the remaining two receiver signals $V_A$ and $V_C$.

Figure 5B:
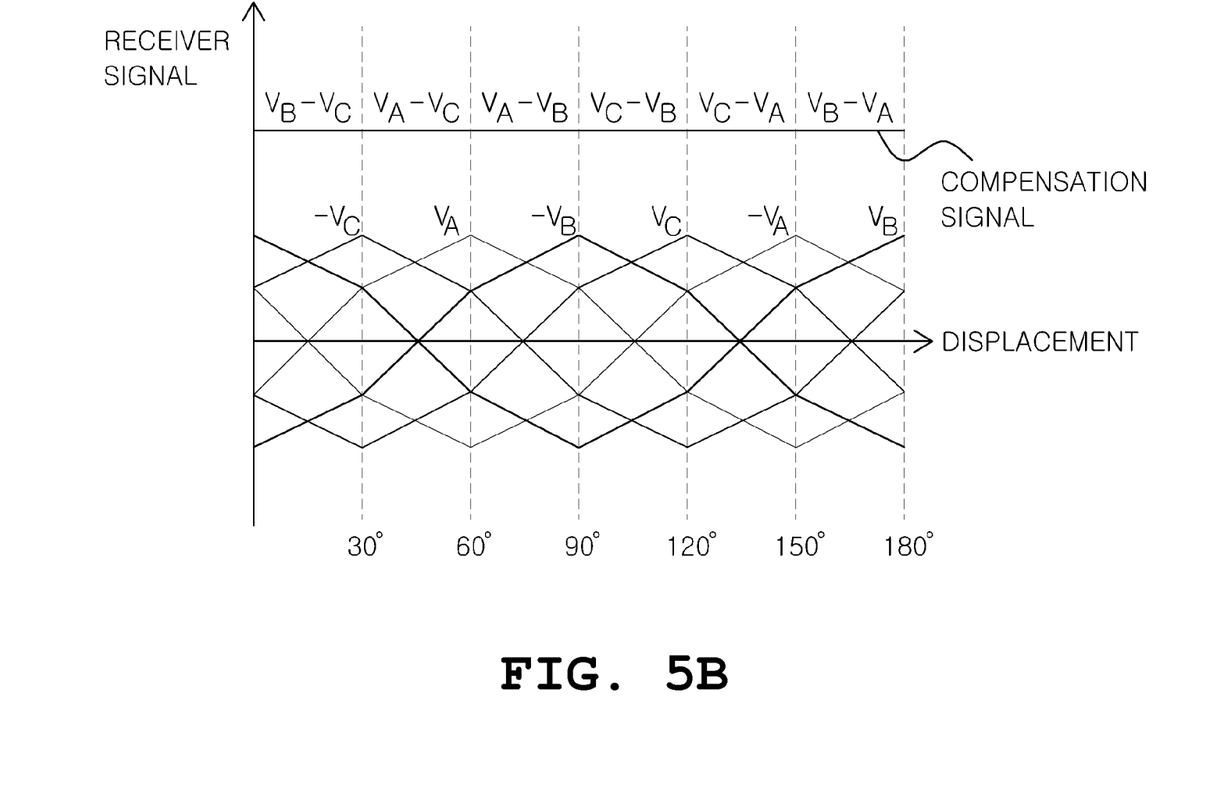

Further, as shown in FIG. 5B, the signal processing unit 160 may generate inverted signals $-V_A$, $-V_B$, and $-V_C$ for the three receiver signals $V_A$, $V_B$, and $V_C$, respectively, and may acquire displacement information about the displacement of the coupler element 120 and a compensation signal corresponding to the displacement using the three receiver signals and the three inverted signals.

Figure 6:
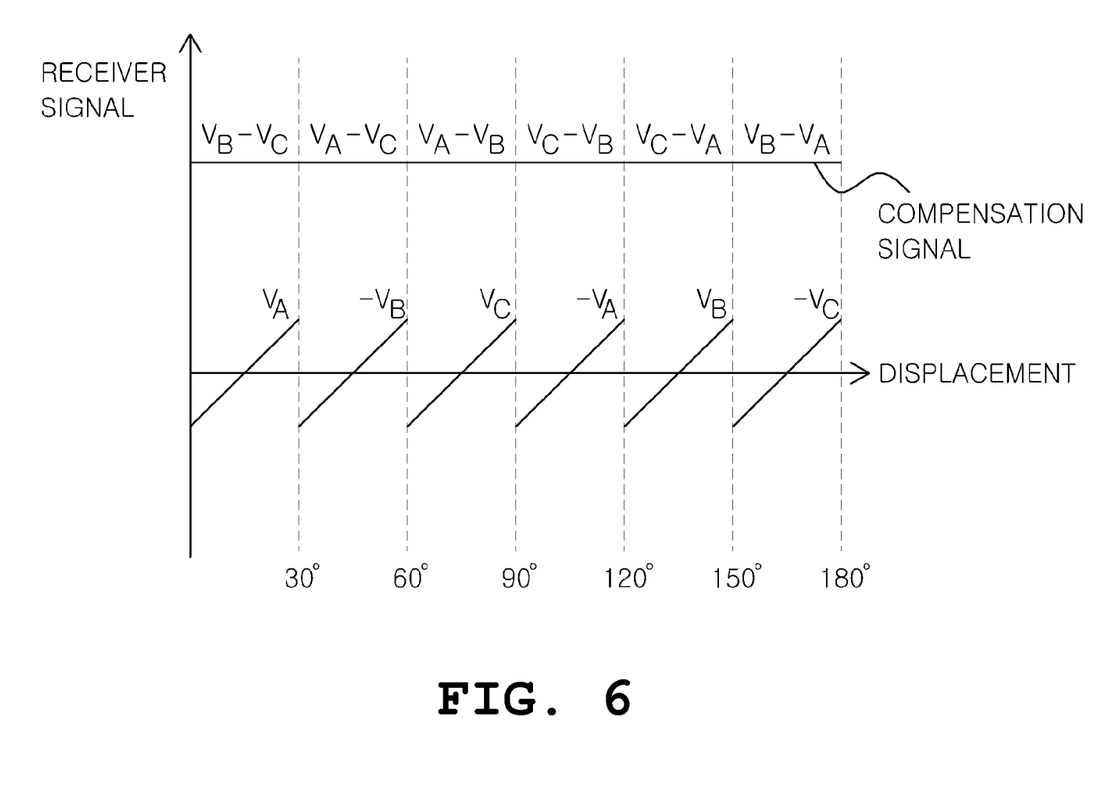
FIG. 6 is a diagram showing examples of a displacement signal and a compensation signal generated from the receiver signals shown in FIG. 5.

As shown in FIG. 6, it can be seen that the signal processing unit 160 is configured such that different receiver signal can be selected depending on the range of displacement of the coupler element, and a compensation signal in the corresponding displacement area is generated using receiver signals that are not selected. For example, when the displacement of the coupler element changes within a range from 60° to 90°, as shown in FIG. 6, the signal processing unit 160 acquires displacement information using $V_C$, the signal variation of which is different from that of other receiver signals, and also acquires a compensation signal, which is independent of the displacement of the coupler element and which includes information about a gap, using $V_A - V_B$. Similarly, when the displacement changes within a range from 90° to 120°, the signal processing unit 160 acquires displacement information using an inverted signal $-V_A$ of $V_A$, and acquires a compensation signal including information about a gap using $V_C - V_B$.

That is, the signal processing unit 160 selects a receiver signal required to generate displacement information and two receiver signals required to generate a compensation signal as different receiver signals, at intervals of the displacement range of the coupler element, for example, the range of an angle of 30°. Accordingly, even if a gap error occurs, displacement information in which a gap is taken into consideration may be acquired based on the receiver signals. Of course, the range of displacement may differ depending on the number of receiver coils and the shape of the coupler element.

In this way, the displacement sensor according to the present invention generates a plurality of receiver signals using the structure of a plurality of receiver coils, each including two loops having different winding directions, and a coupler element corresponding to the receiver coils, acquires the displacement information of the coupler element using one receiver signal having a different signal variation among the plurality of generated receiver signals, and generates a compensation signal, which is independent of the displacement of the coupler element and includes information about a gap, using the remaining receiver signals. Further, displacement information in which a gap is not taken into consideration is compensated for using the generated compensation signal, and thus the displacement of the coupler element in which a gap error has been compensated for may be acquired.

Similarly, the displacement detection apparatus according to the present invention comprises a signal processor which may receive a plurality of receiver signals from the displacement sensor, acquire displacement information using one of the received receiver signals, acquire a compensation signal including information about a gap using the remaining receiver signals, and then compensate for displacement information, in which a gap is not taken into consideration, using the acquired compensation signal, with the result that the displacement of the coupler element in which a gap error has been compensated for may be acquired.

In the above-described FIGS. 1 to 3, although the structure of receiver coils according to the present invention is shown as being the structure of floating coils, the coil structure of the present invention is not limited thereto, and it is possible to use the structure of three or more receiver coils sharing a center tap in which one of two terminals of each receiver coil is connected to ground GND.

Figure 7:
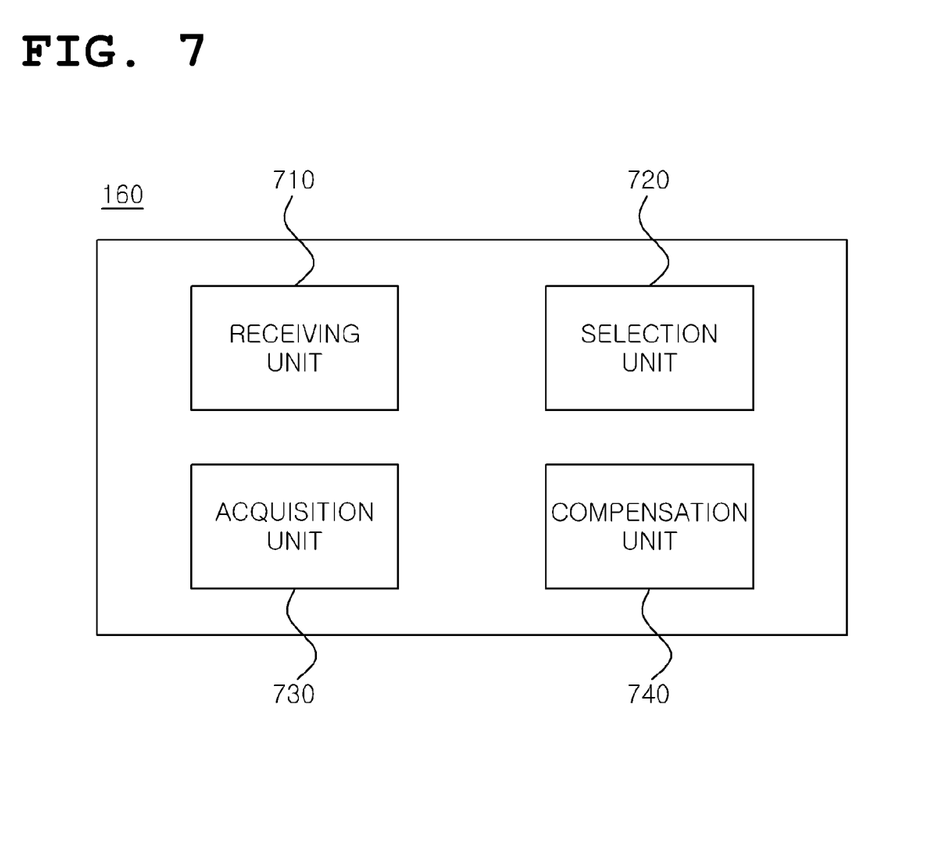
FIG. 7 is a diagram showing the configuration of a displacement detection apparatus according to an embodiment of the present invention.

FIG. 7 illustrates the configuration of a displacement detection apparatus according to an embodiment of the present invention, wherein the displacement detection apparatus corresponds to the signal processing unit shown in FIG. 1.

Referring to FIG. 7, a displacement detection apparatus 160 (or its signal processor) according to the present invention includes a receiving unit 710, a selection unit 720, an acquisition unit 730, and a compensation unit 740.

The receiving unit 710 respectively receives receiver signals from a plurality of receiver coils, each including two loops having different winding directions.

In this case, the receiving unit 710 may receive a receiver signal having a first signal variation and remaining receiver signals having a second signal variation depending on the displacement of the coupler element. For example, when three receiver signals are received from three receiver coils, the receiving unit 710 receives one receiver signal having a first signal variation (signal intensity variation) and two receiver signals having a second signal variation (signal intensity variation) depending on the displacement of the coupler element. Of course, the receiver signal having the first signal variation may be changed according to the displacement range of the coupler element, and the two receiver signals having the second signal variation may also be changed according to the displacement range of the coupler element.

That is, by means of the shapes of the plurality of receiver coils and the coupler element, the receiver coils generate one receiver signal, the signal variation of which has a first gradient, and the remaining receiver signals, the signal variation of which has a second gradient, depending on the displacement of the coupler element. In this case, the receiver signal having the first gradient may be changed depending on the range of the displacement of the coupler element, and this change occurs due to a variation in area by which receiver coils are covered by the poles of the coupler element when the coupler element is rotated. For example, in the case of the first receiver coil, when the range of the displacement is a first section, the absolute value of the signal variation of the first receiver coil has a first gradient, whereas when the range of displacement is a second section and a third section, the absolute value of the signal variation may have a second gradient.

The selection unit 720 selects one receiver signal, required to acquire displacement information, from among the plurality of receiver signals.

In this regard, the selection unit 720 may select a receiver signal having a signal variation (signal intensity variation) differing from that of the remaining receiver signals, as the receiver signal required to acquire displacement information, from among the plurality of receiver signals.

The acquisition unit 730 acquires the displacement information of the coupler element using one receiver signal selected by the selection unit 730, and acquires information about a gap between the coupler element and the transmitting coil or the plurality of receiver coils using the remaining receiver signals.

In this case, the acquisition unit 730 may acquire a compensation signal, which is independent of the displacement of the coupler element and includes the information about the gap, by using differences between the remaining receiver signals.

The compensation unit 740 compensates for the displacement information of the coupler element using the compensation signal acquired by the acquisition unit 730.

That is, since the displacement information acquired by the acquisition unit 730 is displacement information in which the influence of a gap is not taken into consideration, the compensation unit 740 compensates for the displacement information using the compensation signal including the gap information. Accordingly, even if a gap error occurs, displacement information in which the gap error is taken into consideration may be acquired. Therefore, even if the gap error has occurred, the accurate displacement of the coupler element may be detected, thus improving the accuracy and reliability of displacement detection.

Figure 8:
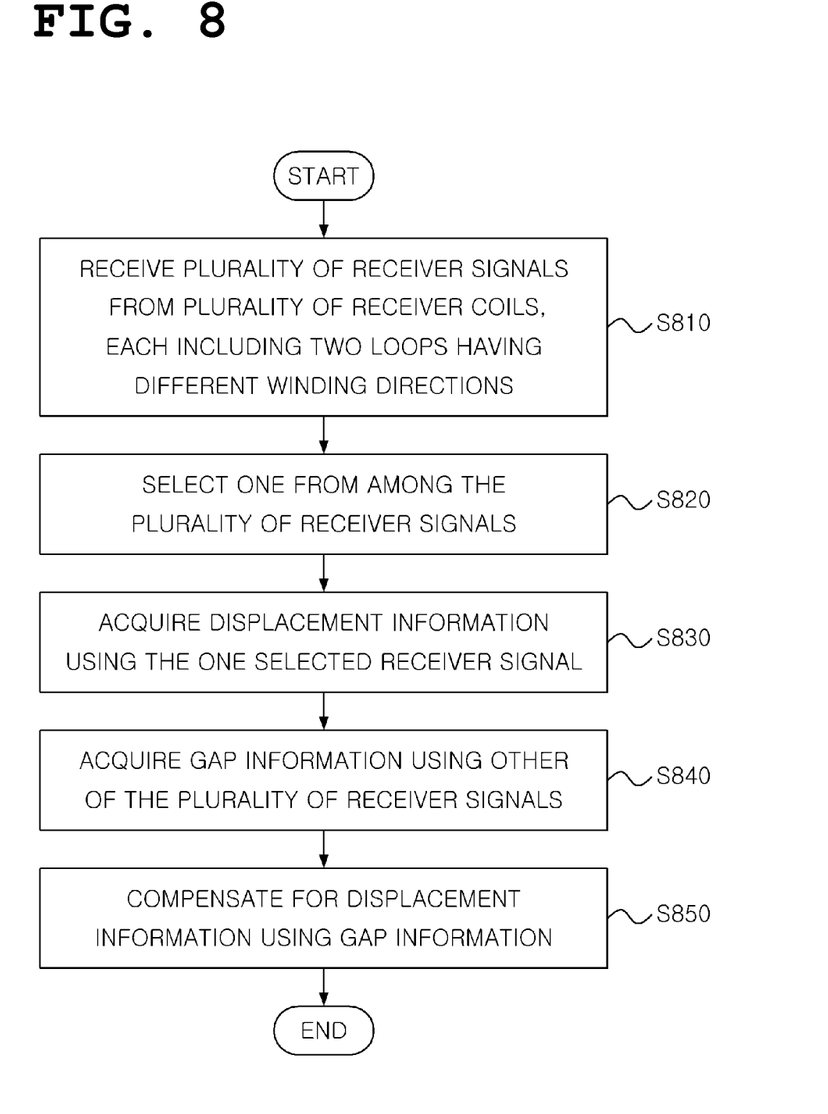
FIG. 8 is an operation flowchart showing a displacement detection method according to an embodiment of the present invention.

FIG. 8 is an operation flowchart showing a displacement detection method according to an embodiment of the present invention, and illustrates a flowchart showing operations performed by the signal processing unit shown in FIG. 1.

Referring to FIG. 8, in the displacement detection method, a plurality of receiver signals generated due to inductive coupling between a transmitting coil excited by an excitation signal to generate electromagnetic radiation and a plurality of receiver coils, each including two loops having different winding directions, are received at step S810.

Here, the receiver coils generate receiver signals due to inductive coupling to the transmitting coil sensitive to the shielding (or disturbance or interference) of electromagnetic radiation by the coupler element, and the received receiver signals may include a single receiver signal having a signal variation (signal intensity variation) differing from that of the remaining receiver signals.

As shown in the example in FIG. 2, the receiver coils which generate receiver signals may be implemented using three or more receiver coils.

When the receiver signals are received, one receiver signal is selected from among the receiver signals at step S820.

Here, the one selected receiver signal is a signal, the signal variation of which is different from that of the remaining receiver signals depending on the displacement of the coupler element, and may be a receiver signal required to easily acquire the displacement information of the coupler element.

If one receiver signal has been selected at step S820, the displacement information of the coupler element is acquired using the selected receiver signal at step S830.

The acquired displacement information is displacement information in which gap information is not taken into consideration and which includes the influence of a gap error when the gap error occurs.

If one receiver signal required to acquire the displacement information has been selected at step S820, a compensation signal, which is independent of the displacement of the coupler element including information about the gap and which is dependent on the gap, is acquired using the remaining receiver signals at step S840.

The compensation signal may be acquired using differences between the remaining receiver signals.

Although steps S830 and S840 have been shown as being sequentially performed, they may be performed in parallel.

At step S840, if the compensation signal required to compensate for the gap has been generated, the displacement information generated at step S830 is compensated for using the compensation signal at step S850.

That is, the displacement information in which a gap error or information about a gap is not taken into consideration is compensated for in consideration of the gap, the accurate displacement of the coupler element can be detected even if the gap error has occurred.

Figure 9:
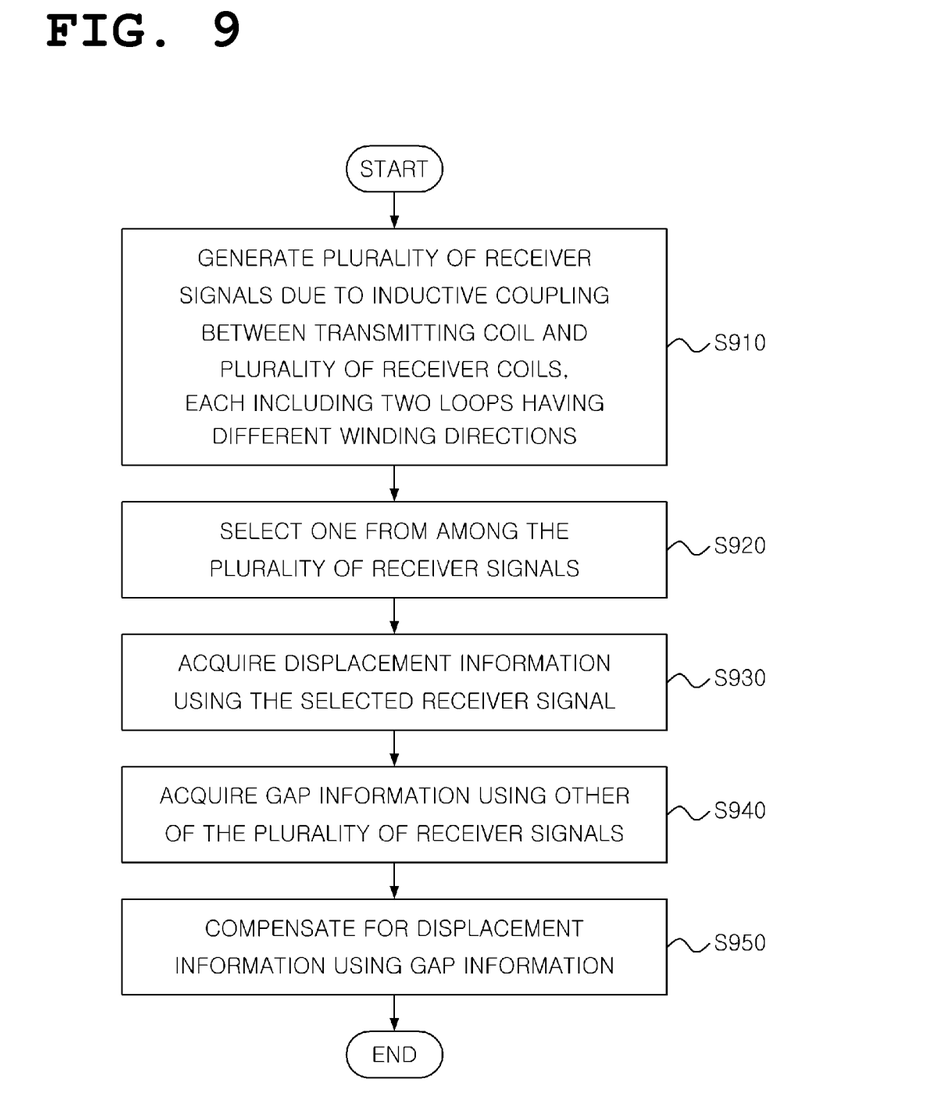
FIG. 9 is an operation flowchart showing a displacement detection method using a displacement sensor according to an embodiment of the present invention.

FIG. 9 is an operation flowchart showing a displacement detection method using a displacement sensor according to an embodiment of the present invention, and illustrates the flowchart of operations performed by the displacement sensor shown in FIG. 1.

Referring to FIG. 9, in the displacement detection method, a plurality of receiver signals are generated due to inductive coupling between a transmitting coil excited by an excitation signal to generate electromagnetic radiation and a plurality of receiver coils, each including two loops having different winding directions, at step S910.

Here, the receiver coils generate receiver signals due to inductive coupling to the transmitting coil sensitive to the shielding of electromagnetic radiation by the coupler element, and the received receiver signals may include a single receiver signal having a signal variation differing from that of the remaining receiver signals.

As shown in the example in FIG. 2, the receiver coils which generate receiver signals may be implemented using three or more receiver coils.

If the plurality of receiver signals have been generated, one receiver signal is selected from among the generated receiver signals, and the displacement information of the coupler element is acquired using the one selected receiver signal at steps S920 and S930.

The step of selecting one receiver signal may be configured to select a receiver signal having a signal variation, differing from that of the remaining receiver signals depending on the displacement of the coupler element, as the signal required to acquire the displacement information of the coupler element.

For example, if it is assumed that, within a predetermined range of displacement (or movement) of the coupler element, the signal variation of a first receiver signal has a first gradient and the signal variations of a second receiver signal and a third receiver signal have a second gradient, the first receiver signal, the signal variation of which has the first gradient, is selected, at step S920. Preferably, the first gradient may be larger than the second gradient.

A compensation signal including information about a gap is acquired or generated using the remaining receiver signals other than the selected receiver signal among the plurality of receiver signals at step S940.

In this case, the compensation signal is a signal that is independent of the displacement of the coupler element and dependent on the gap. The compensation signal having a uniform intensity value without varying depending on the displacement may be generated using the remaining receiver signals.

Although steps S930 and S940 have been shown as being sequentially performed, they may be performed in parallel.

At step S940, if the compensation signal required to compensate for the gap has been generated, the displacement information generated at step S930 is compensated for using the compensation signal at step S950.

That is, step S950 is a procedure for compensating for the displacement information, in which gap error or gap information is not taken into consideration, in consideration of the gap.

The displacement detection method according to the embodiment of the present invention may be implemented in the form of program instructions that can be executed via various computer means, and may be stored in a computer-readable medium. The computer-readable medium may include one of program instructions, data files, and data structures or program instructions, data files, and data structures in combination. The program instructions recorded in the computer-readable medium may be program instructions that are specially designed and configured for the present invention or that are well known to and can be used by those having ordinary knowledge in the field of computer software. Examples of the computer-readable medium includes magnetic media such as a hard disk, a floppy disk and magnetic tape, optical media such as CD-ROM and a DVD, magneto-optical media such as a floptical disk, and hardware devices that are specially configured to store and execute program instructions, such as ROM, RAM, and flash memory. The examples of the program instructions include not only machine language code that is generated by a complier, but also high-level language that can be executed by a computer. The above-described hardware apparatus may be configured to operate as one or more software modules in order to perform the operation of the present invention, and vice versa.

In accordance with the present invention, displacement information in which a gap error has been compensated for can be acquired by using the structure of a plurality of receiver coils, each including two loops having different winding directions, and a coupler element corresponding to the receiver coils, and then detection accuracy of the displacement of a part detected by a displacement sensor can be improved.

In further detail, the present invention acquires displacement information using one of a plurality of receiver signals depending on the displacement of the coupler element, acquires a compensation signal, which is independent of the displacement of the coupler element including information about a gap and which is dependent on the gap, using the remaining receiver signals, and compensates for the displacement information using the acquired compensation signal, thus reducing the displacement error of the part that may occur according to a gap error.

Furthermore, the present invention can compensate for a gap error that may occur when products are manufactured, a gap error that may occur due to abrasion, etc., by compensating for displacement information attributable to a gap error, thus improving the accuracy of displacement detection and enhancing the reliability of operation based on displacement detection.

Although the present invention has been described with reference to specific contents, such as detailed components, the above description is intended merely to help the overall understanding of the present invention, the present invention is not limited to the above embodiments, and those having ordinary knowledge in the technical field to which the present invention pertains can perform variations and modifications in various manners from the above description.

Accordingly, the spirit of the present invention should not be limited to the above-described embodiments, and the accompanying claims and equal or equivalent modifications thereof should be interpreted as falling within the range of the spirit and scope of the present invention.

What is claimed is:

1. A displacement detection apparatus comprising:
  a processor configured to:
    receive a plurality of receiver signals dependent on displacement of a coupler element;
    determine a first receiver signal having a signal variation differing from that of other receiver signals, from among the plurality of receiver signals, depending on the displacement of the coupler element;
    acquire information about the displacement of the coupler element and information about a gap between the coupler element and one of: a transmitting coil and a plurality of receiver coils, wherein the information about the gap is acquired by using a plurality of second receiver signals from among the plurality of receiver signals except for the first receiver signal, and each of the plurality of receiver signals is dependent on the displacement of the coupler element; and
    compensate for the acquired displacement information using the acquired gap information.

2. The displacement detection apparatus of claim 1, wherein the processor is further configured to:
  acquire the displacement information using one of the plurality of receiver signals, and
  acquire a compensation signal, independent of the displacement of the coupler element and including the gap information, using the plurality of second receiver signals, wherein each of the plurality of second receiver signals is dependent on displacement of the coupler element.

3. The displacement detection apparatus of claim 1, wherein the processor is further configured to:
  acquire the displacement information using first receiver signal.

4. The displacement detection apparatus of claim 3, wherein the processor is further configured to generate a third receiver signal based on the first receiver signal or an inverted signal of the first receiver signal.

5. A displacement detection method comprising:
  receiving, by a processor, a plurality of receiver signals dependent on displacement of a coupler element;
  determining, by the processor, a first receiver signal having a signal variation differing from that of other receiver signals, from among the plurality of receiver signals, depending on the displacement of the coupler element;
  acquiring, by the processor, information about the displacement of the coupler element and information about a gap between the coupler element and one of: a transmitting coil and a plurality of receiver coils, wherein the information about the gap is acquired by using a plurality of second receiver signals from among the plurality of receiver signals except for the first receiver signal, and each of the plurality of receiver signals is dependent on the displacement of the coupler element; and
  compensating for, by the processor, the acquired displacement information using the acquired gap information.

6. The displacement detection method of claim 5, further comprising:
  acquiring, by the processor, the displacement information using one of the plurality of receiver signals; and
  acquiring, by the processor, a compensation signal, independent of the displacement of the coupler element and including the gap information, using the plurality of second receiver signals, wherein each of the plurality of second receiver signals is dependent on displacement of the coupler element.

7. The displacement detection method of claim 5, further comprising:
  acquiring, by the processor, the displacement information using the first receiver signal.

8. The displacement detection method of claim 7, further comprising generating, by the processor, a third receiver signal based on the first receiver signal or an inverted signal of the first receiver signal.

* * * * *